(12) United States Patent
Cagle

(10) Patent No.: US 7,784,486 B2
(45) Date of Patent: Aug. 31, 2010

(54) DRAIN TAP

(76) Inventor: Stephen M. Cagle, 3376 Palio Ave., Las Vegas, NV (US) 89141

( * ) Notice: Subject to any disclaimer, the term of this patent is extended or adjusted under 35 U.S.C. 154(b) by 436 days.

(21) Appl. No.: 11/513,591

(22) Filed: Aug. 31, 2006

(65) Prior Publication Data

US 2008/0053529 A1 Mar. 6, 2008

(51) Int. Cl.
*F16L 33/00* (2006.01)
(52) U.S. Cl. .............................. 137/313; 137/362; 4/286
(58) Field of Classification Search ................. 137/313, 137/362, 357; 4/287, 288, 295, 286
See application file for complete search history.

(56) References Cited

U.S. PATENT DOCUMENTS

| | | | |
|---|---|---|---|
| 964,954 A | 7/1910 | Coles | |
| 4,543,892 A | 10/1985 | Tomlinson et al. | |
| 4,722,556 A | 2/1988 | Todd | |
| 4,758,027 A | 7/1988 | Todd | |
| 5,123,677 A | 6/1992 | Kreczko et al. | |
| 5,214,887 A | 6/1993 | Beert | |
| 5,694,972 A | 12/1997 | King | |
| 5,934,331 A | 8/1999 | Earl | |
| 6,135,140 A * | 10/2000 | Grandinetti | 137/362 |
| 6,431,217 B2 * | 8/2002 | Robinson | 138/110 |
| 7,048,310 B2 | 5/2006 | Billmyer | |
| 7,082,961 B2 * | 8/2006 | Phillips | 137/382 |
| 2005/0236057 A1 | 10/2005 | Slentz | |

* cited by examiner

*Primary Examiner*—Kevin L Lee
(74) *Attorney, Agent, or Firm*—Hovey Williams LLP

(57) ABSTRACT

An inexpensive, compact, conveniently installed drain tap for disposing of water from a condensate hose. The drain tap channels condensate water from a hose to a drain having at least one drain hole. The tap includes a base forming a hollow channel. The base has a spillway at one end of the channel, in fluid communication therewith. A peg extends downward from the base, including at least one hole barb adapted for retractable insertion into the drain hole. A hose connector is formed on the base, adapted for engagement with one end of the hose. The hose connector is in fluid communication with the base channel, so that when the peg is inserted into the drain hole and one end of the hose is engaged with the hose connector, water may flow through the hose, into the base channel and exit from the spillway onto the drain. In preferred embodiments, the hose connector includes at least one hose barb for gripping engagement of the hose. Additionally, in preferred embodiments the peg includes a U-shaped invagination in the center for compression of the end of the peg when extraction of the peg from the drain hole is desired.

19 Claims, 4 Drawing Sheets

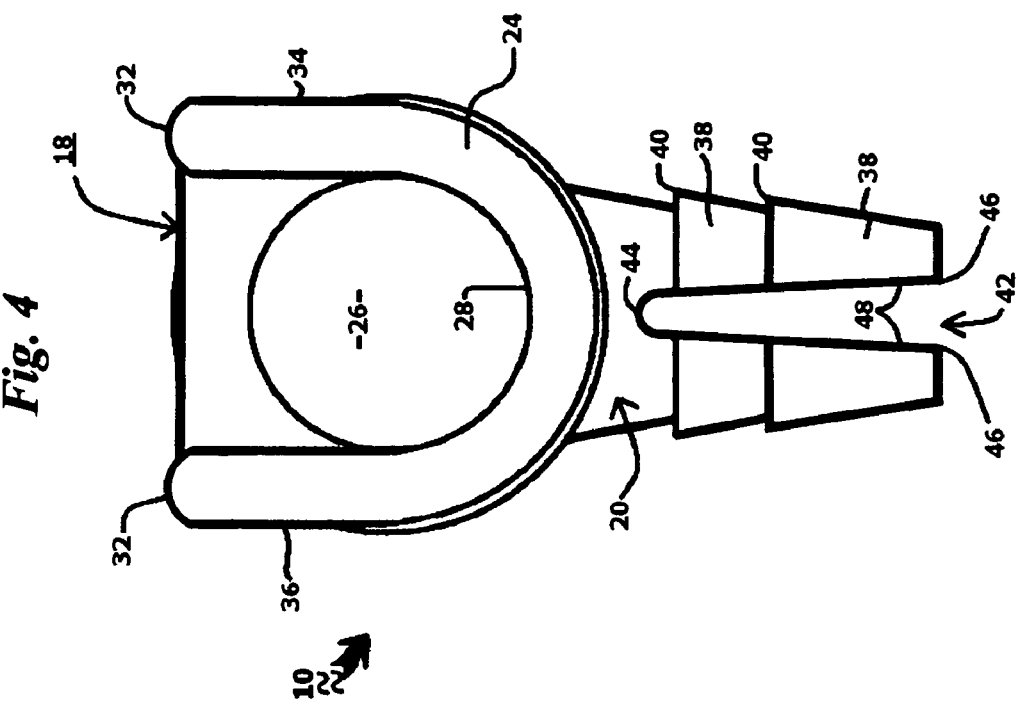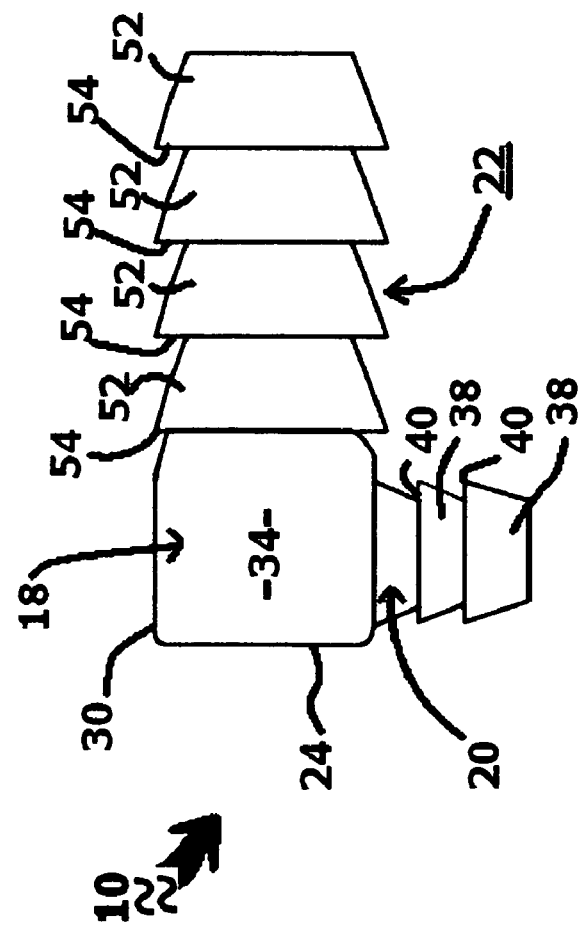

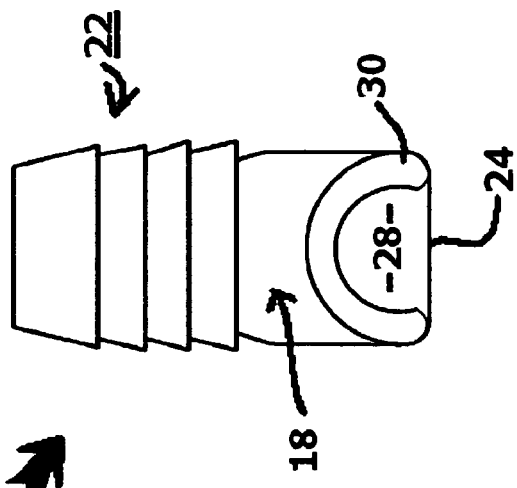
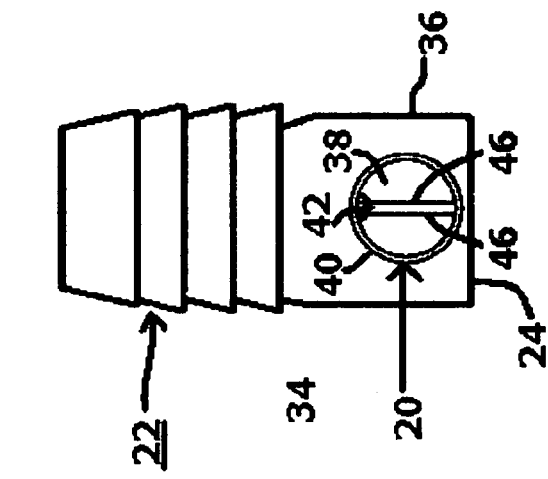
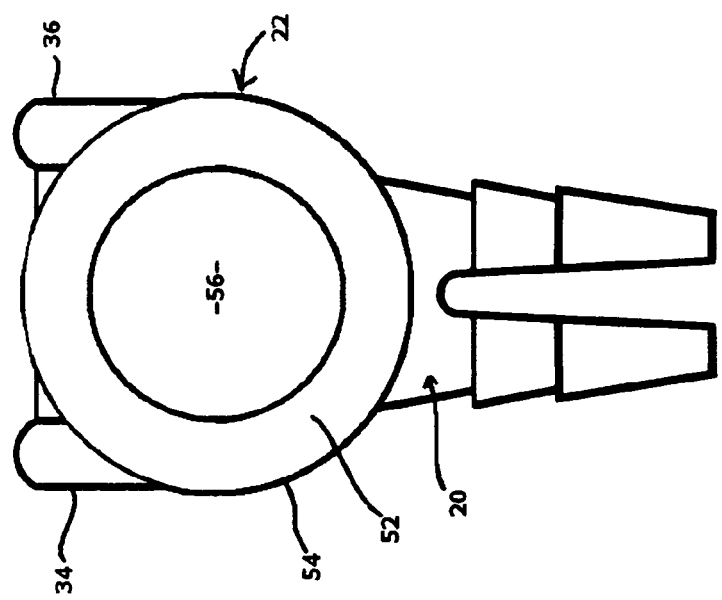

DRAIN TAP

FIELD OF THE INVENTION

This invention relates to drain taps. More particularly, the invention relates to a drain tap for disposal of condensate water to a drain.

DESCRIPTION OF RELATED ART

Many devices, such as air conditioners or humidifiers, produce unwanted condensate water. If ignored, such condensate water produces various problems such as dripping, wet spots and mold. The simplest solution is to provide a hose which channels the condensate water to a floor drain. It is desirable to secure the drain end of the hose to a fixed point at the drain to avoid that end moving away from the drain, which could result in a wet spot on the floor or other problems.

The previous attempt at securing the drain end of the hose is illustrated at US 2005/0236057 A1. This device, however, is unsatisfactory for several reasons. First, this prior attempt requires a sealing gasket which necessitates a sealing step in installation. In addition, the installation requires other elements such as a screw and washer for securing the device necessitating multiple steps in installation. The bulk of the device is aesthetically undesirable and will interfere with the overall effective drainage area of the drain. Also, the bulk and profile of the device presents a hazard for those walking in the drain area. In addition the expense of such an approach is undesirable for such a simple problem. Finally, the requirement of a gasket creates the possibility of mold, fungal accumulation and the like on the drain.

What is needed is a condensate hose securing solution which is small, unitary, inexpensive and easy to install. In addition, a solution is needed which minimizes the chance of moisture accumulation on the drain itself, thereby minimizing the possibility of mold and the like.

SUMMARY OF THE INVENTION

The present invention satisfies the need for an inexpensive, compact, conveniently installed article for disposing of water from a condensate hose. Furthermore the present invention provides an article which is easily replaced or removed when appropriate.

The drain tap according to the present invention, for channeling condensate water from a hose to a drain having at least one drain hole, includes a base forming a hollow channel. The base has a spillway at one end of the channel, in fluid communication therewith. A peg extends downward from the base, including at least one hole barb adapted for retractable insertion into the drain hole. A hose connector is formed on the base, adapted for engagement with one end of the hose. The connector is in fluid communication with the base channel, so that when the peg is inserted into the drain hole and one end of the hose is engaged with the hose connector, water may flow through the hose, into the base channel and exit from the spillway onto the drain.

In preferred embodiments, the hose connector includes at least one hose barb for gripping engagement of the hose. Additionally, in preferred embodiments the peg includes a U-shaped invagination in the center for flexible compression of the end of the peg when extraction of the peg from the drain hole is desired.

BRIEF DESCRIPTION OF THE DRAWINGS

FIG. 3 is a side elevational view of the inventive drain tap;
FIG. 4 is a front elevational view of the drain tap of FIG. 3;
FIG. 5 is a rear elevational view of the drain tap of FIG. 3;
FIG. 6 is a bottom view of the drain tap of FIG. 3;
and
FIG. 7 is a top view of the drain tap of FIG. 3.

DETAILED DESCRIPTION OF THE INVENTION

Figure 1:
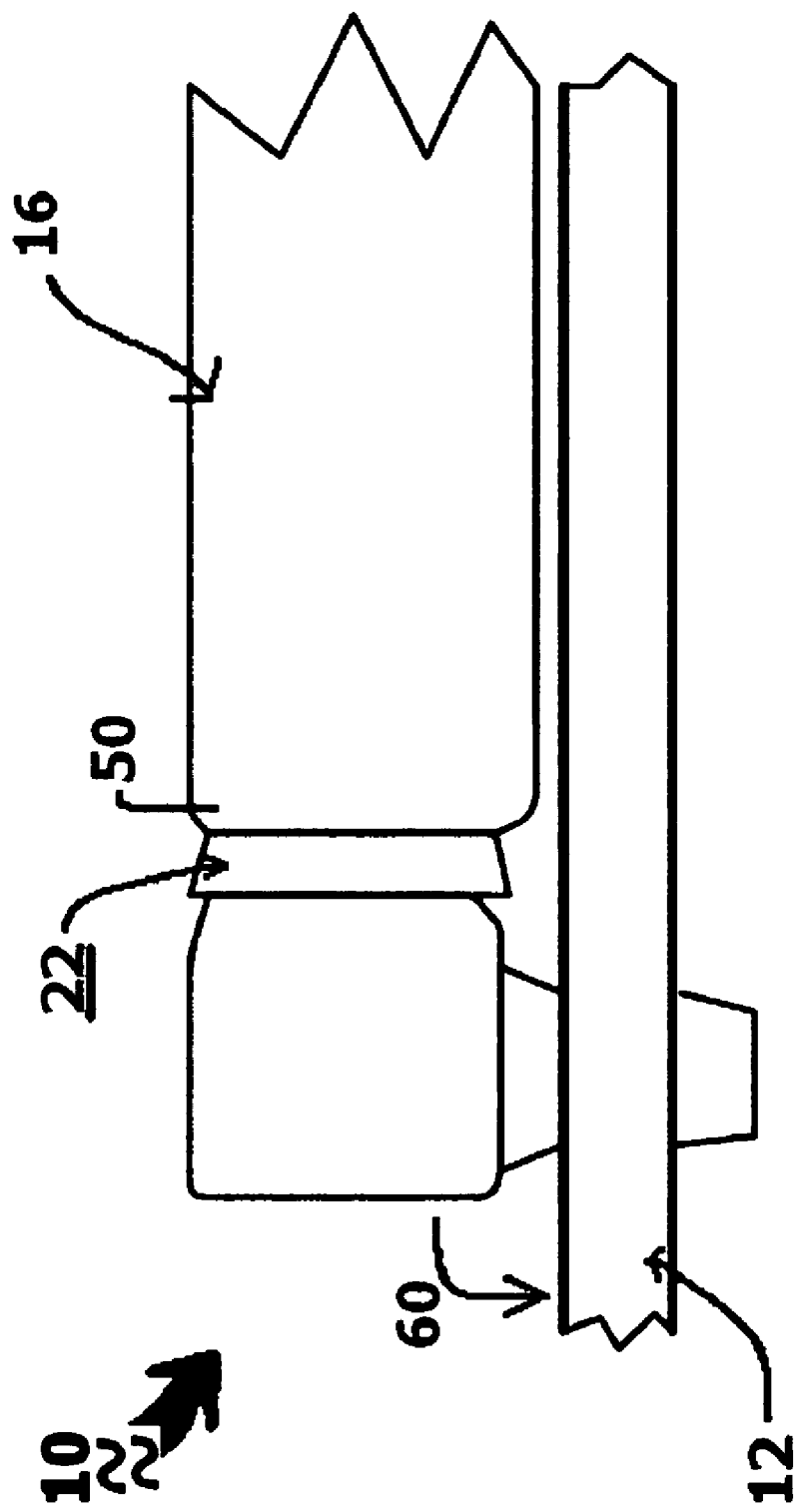
FIG. 1 is a partial side elevational view, of a drain tap according to the present invention installed on a drain and engaged with a hose.

Referring now to the drawings in general and FIG. 1 in particular, a drain tap 10 according to the present invention, is shown in use with a drain 12 situated on a floor 14 (shown partially in FIG. 2), and a condensate drain hose 16. Drain hose 16 is typically connected to a humidifier or air conditioner (neither of which are shown) or any other device which would generate unwanted moisture or water. Drain tap 10 is substantially made of PVC in the preferred embodiment, but those skilled in the art will readily appreciate that other synthetic resin materials or other suitable materials may also be used.

Referring to FIG. 3, drain tap 10 is shown to have a base 18, a peg 20 and a hose connector 22. In preferred embodiments the entire length of tap 10 spanning base 18 and hose connector 22 is one and 7/16 inch. The lengthwise dimension of peg 20 is 5/8 inch. Other dimensions are readily accommodated by the invention.

FIG. 4 shows base 18 having a front 24. Base 18 forms a hollow channel 26 in the interior thereof, with a spillway 28 formed proximal front 24 (see also FIG. 7). Front 24 of base 18 is formed to present a U-shaped cross-section as will readily be appreciated by reference to FIG. 4. Front 24 also includes a head member 30 which is U-shaped as seen from above (see FIG. 7). Head member 30 has rounded tops 32.

Base 18 has sidewalls 34 and 36, which are substantially vertical and parallel. Sidewalls 34 and 36 are configured to be at substantially at the same uppermost elevation. Spillway 28 is in fluid communication with channel 26.

Referring again to FIG. 3, peg 20 extends downwardly from base 18. Peg 20 includes two hole barbs 38 in the preferred embodiment, although a different number of hole barbs 38 may be used. Hole barbs 38 are conical in shape having a circular apex 40 of hole barb 38 which is 3/8 inch in the preferred embodiment.

Referring to FIG. 4, peg 20 includes portions forming a U-shaped invagination 42 therein. Invagination 42 is formed to have an arcuate bight 44 at the top thereof. As will be noted by inspection, invagination 42 presents a greater width at lowermost edges 46. In preferred embodiments the greater width at the bottom of invagination 42 is achieved by sloping inner walls 48 of invagination 42 at an angle of between 5 and 7 degrees with respect to the vertical.

Referring again to FIG. 3, hose connector 22 is disposed on base 18 and adapted for engagement with one end 50 of hose 16 (see FIG. 1). Hose connector 22 includes four hose barbs 52. Each hose barb 52 is conical in shape presenting a hose barb apex 54. In preferred embodiments, apex 54 of each hose barb 52 presents a diameter of 5/8 inch in order to engage a hose 16 of diameter ⅝ inch. It will readily be appreciated that each barb 52 may be modified in diameter of apex 54 to accommodate a ¾ inch hose or any different diameter for an alternative hose 16.

Referring to FIG. 5, hose connector forms a hose channel 56 in the interior thereof, and which is in contiguous with and in fluid communication with base channel 26.

Figure 2:
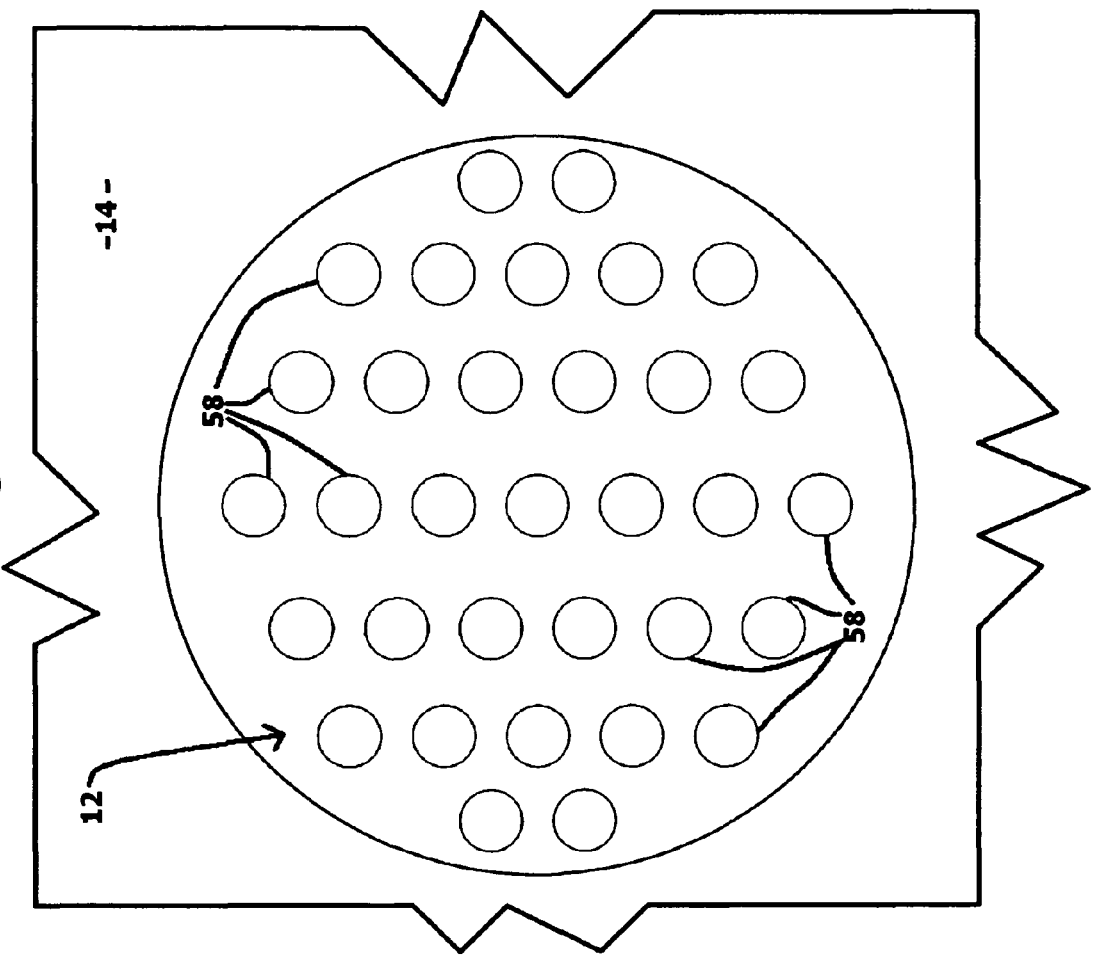
FIG. 2 is a top plan view of the drain disposed in a portion of a floor.

Installation of drain tap 10 will now be discussed. Referring to FIG. 2, drain 12 is situated in floor 14 and includes a plurality of drain holes 58. Peg 20 is manually inserted into one drain hole 58. Such manual insertion is typically readily achieved due to the flexibility of peg 20. In particular and with reference to FIG. 6, it can be seen that invagination 42 of peg 20 results in enhanced compressibility because as mechanical pressure is exerted by drain hole 58 on lower most hole barb 38 during insertion lower most edges 46 of invagination 42 may be compressed together. In the event that drain 12 (see FIG. 2) is made of a harder material, such as cast iron, a hammer (not shown) may be used by tapping on head member 30 (see FIG. 7) in a downward motion to insert peg 20 into drain hole 58 in order to achieve the configuration of tap 10 and drain 12 shown in FIG. 1. After drain tap 10 is securely inserted in one hole 58 of drain 12, hose 16 is attached to hose connector 22 as shown in FIG. 1.

Once the configuration shown in FIG. 1 has been achieved, moisture, water, or other condensate material, may flow through hose 16 and enter hollow hose channel 56 (see FIG. 5). Since hose channel 56 is in fluid communication with base channel 26 (see FIG. 4), fluid may flow continuously through base channel 26, onto spillway 28 and exit from front 24 of base 18 out onto drain 12 as indicated at reference numeral 60. And thus fluid is drained in the normal fashion.

In the event that drain tap 10 is desired to be removed from drain 12, it may be done easily by simply pinching peg 20 at the bottom so that edges 46 of invagination 38 are pressed together, thus relieving the mechanical tension between drain hole 58 and peg 22.

Although the invention has been particularly shown and described with reference to preferred embodiments thereof, it will be understood by those skilled in the relevant art that various changes in form and details may he made therein without departing from the spirit and scope of the invention as defined in the appended claims.

What is claimed is:

1. A drain tap for channeling water from a hose to a drain having at least one drain hole, the tap comprising:
   a base forming a hollow channel, the base further including a spillway at one end of the channel, the spillway in fluid communication with the channel;
   a peg extending downwardly from the base, the peg including at least one hole barb adapted for retractable insertion into one drain hole and portions forming a U-shaped invagination therein; and
   a hose connector disposed on the base and adapted for engagement with one end of the hose, the connector in fluid communication with the base channel, such that when the peg is inserted into the drain hole and further when one end of the hose is engaged with the hose connector, water may flow through the hose, into the base channel and exit from the spillway onto the drain.

2. The drain tap of claim 1 wherein the tap is substantially made of PVC material.

3. The drain tap of claim 1 wherein the channel is formed to present a U-shaped cross section.

4. The drain tap of claim 1 wherein the channel includes sidewalls with rounded tops.

5. The drain tap of claim 1 wherein the channel includes two sidewalls which are substantially vertical and parallel and further wherein the respective top of each sidewall is configured so that each presents substantially the same elevation when the peg is inserted into the drain hole.

6. The drain tap of claim 1 wherein the hose connector includes at least one hose barb.

7. The drain tap of claim 6 wherein the hose connector barb is configured to engage a hose of ⅝ inch diameter.

8. The drain tap of claim 6 wherein the hose connector barb is configured to engage a hose of ¾ inch diameter.

9. The drain tap of claim 1 wherein the U-shaped invagination is formed to have a greater width at the bottom of the peg.

10. The drain tap of claim 9 wherein the U-shaped invagination is formed to have a greater width at the bottom of the peg such that each downwardly extending wall of the invagination is inclined outwardly from the top of the invagination at an angle of between five and seven degrees with respect to the vertical.

11. The drain tap of claim 9 wherein the U-shaped invagination is formed to have an arcuate bight at the top thereof.

12. A drain tap for channeling water from a hose to a drain having at least one drain hole, the tap comprising:
   a base forming a hollow channel, the base further including a spillway at one end of the channel, the spillway in fluid communication with the channel;
   a peg extending downwardly from the base, the peg including at least one hole barb adapted for retractable insertion into one drain hole; and
   a hose connector disposed on the base and adapted for engagement with one end of the hose, the connector in fluid communication with the base channel, such that when the peg is inserted into the drain hole and further when one end of the hose is engaged with the hose connector, water may flow through the hose, into the base channel and exit from the spillway onto the drain.

13. The drain tap of claim 12 wherein the peg extends substantially perpendicular relative to the hose connector.

14. The drain tap of claim 12 wherein the channel includes two sidewalls which are substantially vertical and parallel and further wherein the respective top of each sidewall is configured so that each presents substantially the same elevation when the peg is inserted into the drain hole.

15. The drain tap of claim 12 wherein the hose connector includes at least one hose barb.

16. The drain tap of claim 12 wherein the peg includes portions forming a U-shaped invagination therein.

17. The drain tap of claim 16 wherein the U-shaped invagination is formed to have a greater width at the bottom of the peg.

18. The drain tap of claim 16 wherein the U-shaped invagination is formed to have a greater width at the bottom of the peg such that each downwardly extending wall of the invagination is inclined outwardly from the top of the invagination at an angle of between five and seven degrees with respect to the vertical.

19. The drain tap of claim 16 wherein the U-shaped invagination is formed to have an arcuate bight at the top thereof.

* * * * *